(12) United States Patent
Wang et al.

(10) Patent No.: US 12,105,767 B2
(45) Date of Patent: Oct. 1, 2024

(54) DIGITAL CONTENT LAYOUT ENCODING FOR SEARCH

(71) Applicant: Adobe Inc., San Jose, CA (US)

(72) Inventors: Zhaowen Wang, San Jose, CA (US); Yue Bai, Malden, MA (US); John Philip Collomosse, 18 Abbey Close (GB)

(73) Assignee: Adobe Inc., San Jose, CA (US)

( * ) Notice: Subject to any disclaimer, the term of this patent is extended or adjusted under 35 U.S.C. 154(b) by 353 days.

(21) Appl. No.: 17/735,748

(22) Filed: May 3, 2022

(65) Prior Publication Data
US 2023/0359682 A1 Nov. 9, 2023

(51) Int. Cl.
| | | |
|---|---|---|
| G06F 16/9537 | (2019.01) | |
| G06F 40/103 | (2020.01) | |
| G06F 40/30 | (2020.01) | |
| G06V 30/19 | (2022.01) | |
| G06K 15/02 | (2006.01) | |
| G06N 3/08 | (2023.01) | |
| G06N 20/00 | (2019.01) | |
| G06V 10/82 | (2022.01) | |
| G06V 30/412 | (2022.01) | |
| G06V 30/414 | (2022.01) | |

(52) U.S. Cl.
CPC ........ *G06F 16/9537* (2019.01); *G06F 40/103* (2020.01); *G06F 40/30* (2020.01); *G06V 30/19127* (2022.01); *G06K 15/1885* (2013.01); *G06N 3/08* (2013.01); *G06N 20/00* (2019.01); *G06V 10/82* (2022.01); *G06V 30/412* (2022.01); *G06V 30/414* (2022.01)

(58) Field of Classification Search
None
See application file for complete search history.

(56) References Cited

U.S. PATENT DOCUMENTS

| 10,664,941 | B1 * | 5/2020 | Osborn | ............ G06Q 20/40145 |
|---|---|---|---|---|
| 2002/0196467 | A1 * | 12/2002 | Delhoune | .......... G06K 15/1863 |
| | | | | 358/1.18 |
| 2008/0295003 | A1 * | 11/2008 | Behl | ..................... G06F 16/954 |
| | | | | 715/760 |

(Continued)

OTHER PUBLICATIONS

Breuel, Thomas M, "High Performance Document Layout Analysis", Symposium on Document Image Understanding Technology [retrieved Feb. 18, 2022]. Retrieved from the Internet <http://citeseerx.ist.psu.edu/viewdoc/download?doi=10.1.1.400.9131&rep=rep1&type=pdf#page=212>., Apr. 2003, 10 Pages.

(Continued)

*Primary Examiner* — Haris Sabah

(57) ABSTRACT

Digital content layout encoding techniques for search are described. In these techniques, a layout representation is generated (using machine learning automatically and without user intervention) that describes a layout of elements included within the digital content. In an implementation, the layout representation includes a description of both spatial and structural aspects of the elements in relation to each other. To do so, a two-pathway pipeline that is configured to model layout from both spatial and structural aspects using a spatial pathway, and a structural pathway, respectively. In one example, this is also performed through use of multi-level encoding and fusion to generate a layout representation.

20 Claims, 8 Drawing Sheets

(56) References Cited

U.S. PATENT DOCUMENTS

2021/0014514 A1* 1/2021 Nagaoka .............. H04N 19/176
2021/0397942 A1* 12/2021 Collomosse .......... G06F 16/583

OTHER PUBLICATIONS

Bylinskii, Zoya, et al., "Learning Visual Importance for Graphic Designs and Data Visualizations", Cornell University arXiv, arXiv.org [retrieved Feb. 18, 2022]. Retrieved from the Internet <https://arxiv.org/pdf/1708.02660.pdf>., Aug. 8, 2017, 13 pages.

Chen, Jintai, et al., "A Hierarchical Graph Network for 3D Object Detection on Point Clouds", CCVPR [retrieved Feb. 18, 2022]. Retrieved from the Internet <https://openaccess.thecvf.com/content_CVPR_2020/papers/Chen_A_Hierarchical_Graph_Network_for_3D_Object_Detection_on_Point_CVPR_2020_paper.pdf?ref=https://githubhelp.com>., 2020, 10 Pages.

Chen, Haochen, et al., "HARP: Hierarchical Representation Learning for Networks", Cornell University arXiv, arXiv.org [retrieved Feb. 18, 2022]. Retrieved from the Internet <https://arxiv.org/pdf/1706.07845.pdf>., Nov. 16, 2017, 8 Pages.

Dayama, Niraj, et al., "GRIDS: Interactive Layout Design with Integer Programming", Cornell University arXiv, arXiv.org [retrieved Feb. 18, 2022]. Retrieved from the Internet <https://arxiv.org/pdf/2001.02921.pdf>., Jan. 9, 2020, 13 Pages.

Deka, Biplab, et al., "Rico: A Mobile App Dataset for Building Data-Driven Design Applications", Proceedings of the 30th Annual ACM Symposium on User Interface Software and Technology [retrieved Feb. 18, 2022]. Retrieved from the Internet <http://www.jeffreynichols.com/papers/p845-deka.pdf>., Oct. 2017, 10 Pages.

Gadi Patil, Akshay, et al., "READ: Recursive Autoencoders for Document Layout Generation", Cornell University arXiv, arXiv.org [retrieved Feb. 21, 2022]. Retrieved from the Internet <https://arxiv.org/pdf/1909.00302.pdf>., Apr. 16, 2020, 10 Pages.

Geigel, Joe, et al., "Automatic Page Layout Using Genetic Algorithms for Electronic Albuming", Proceedings of the SPIE, vol. 4311 [retrieved Feb. 18, 2022]. Retrieved from the Internet <https://web.archive.org/web/20060428223252id_/http://www.jogle.com:80/Research/publications/spieFinal.pdf>., Dec. 2000, 12 Pages.

Girshick, Ross, "Fast R-CNN", Proceedings of the IEEE International Conference on Computer Vision [retrieved Feb. 18, 2022]. Retrieved from the Internet <http://www.micc.unifi.it/bagdanov/pdfs/Fast-RCNN.pdf>., Sep. 27, 2015, 9 Pages.

Gu, Jiuxiang, et al., "Unpaired Image Captioning via Scene Graph Alignments", Cornell University arXiv, arXiv.org [retrieved Feb. 18, 2022]. Retrieved from the Internet <https://arxiv.org/pdf/1903.10658.pdf>., Aug. 17, 2019, 10 Pages.

Harrington, Steven J, et al., "Aesthetic Measures for Automated Document Layout", Proceedings of the 2004 ACM symposium on Document engineering [retrieved Feb. 18, 2022]. Retrieved from the Internet <http://citeseerx.ist.psu.edu/viewdoc/download?doi=10.1.1.87.912&rep=rep1&type=pdf>., Oct. 2004, 3 Pages.

He, Kaiming, et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.

Hu, Ruizhen, et al., "Graph2Plan: Learning Floorplan Generation from Layout Graphs", Cornell University arXiv, arXiv.org [retrieved Feb. 18, 2022]. Retrieved from the Internet <https://arxiv.org/pdf/2004.13204.pdf>., Apr. 27, 2020, 14 Pages.

Hurst, Nathan, et al., "Review of Automatic Document Formatting", Proceedings of the 9th ACM symposium on Document engineering [retrieved Feb. 18, 2022]. Retrieved from the Internet <http://citeseerx.ist.psu.edu/viewdoc/download?doi=10.1.1.431.8390&rep=rep1&type=pdf>., Sep. 18, 2009, 10 pages.

Kumar, Ranjitha, et al., "Bricolage: Example-Based Retargeting for Web Design", CHI '11: Proceedings of the SIGCHI Conference on Human Factors in Computing Systems [retrieved Feb. 18, 2022]. Retrieved from the Internet <https://hci.stanford.edu/publications/2011/Bricolage/Bricolage-CHI2011.pdf>., May 2011, 10 pages.

Li, Jianan, et al., "LayoutGAN: Generating Graphic Layouts with Wireframe Discriminators", Cornell University arXiv, arXiv.org [retrieved Feb. 18, 2022]. Retrieved from the Internet <https://arxiv.org/pdf/1901.06767.pdf>., Sep. 27, 2018, 16 pages.

Li, Kunpeng, et al., "Visual Semantic Reasoning for Image-Text Matching", Cornell University arXiv, arXiv.org [retrieved Feb. 18, 2022]. Retrieved from the Internet <https://arxiv.org/pdf/1909.02701.pdf>., Sep. 6, 2019, 9 Pages.

Liu, Yang, et al., "Hierarchical Transformers for Multi-Document Summarization", Cornell University arXiv, arXiv.org [retrieved Feb. 18, 2022]. Retrieved from the Internet <https://arxiv.org/pdf/1905.13164.pdf>., May 30, 2019, 12 Pages.

Liu, Thomas F, et al., "Learning Design Semantics for Mobile Apps", Proceedings of the 31st Annual ACM Symposium on User Interface Software and Technology [retrieved Feb. 18, 2022]. Retrieved from the Internet <https://par.nsf.gov/servlets/purl/10092355>., Oct. 11, 2018, 11 Pages.

Manandhar, Dipu, et al., "Learning Structural Similarity of User Interface Layouts Using Graph Networks", Computer Vision—ECCV 2020 [retrieved Feb. 18, 2022]. Retrieved from the Internet <http://personal.ee.surrey.ac.uk/Personal/J.Collomosse/pubs/Manandhar-ECCV-2020.pdf>., Nov. 2020, 16 Pages.

Mo, Kaichun, et al., "StructureNet: Hierarchical Graph Networks for 3D Shape Generation", Cornell University arXiv, arXiv.org [retrieved Feb. 18, 2022]. Retrieved from the Internet <https://arxiv.org/pdf/1908.00575.pdf>., Aug. 1, 2019, 29 Pages.

O'Donovan, Peter, et al., "Learning Layouts for Single-PageGraphic Designs", IEEE Transactions on Visualization and Computer Graphics vol. 20, No. 8 [retrieved Feb. 18, 2022]. Retrieved from the Internet <https://doi.org/10.1109/TVCG.2014.48>, Mar. 21, 2014, 14 Pages.

O'Gorman, Lawrence, et al., "Document Image Analysis", IEEE Computer Society Executive Briefings, ISBN 0-8186-7802-X [retrieved Jul. 1, 2022]. Retrieved from the Internet <https://citeseerx.ist.psu.edu/viewdoc/download?doi=10.1.1.182.6107&rep=rep1&type=pdf>, 1995, 125 Pages.

O'Donovan, Peter, et al., "DesignScape: Design with Interactive Layout Suggestions", Proceedings of the 33rd Annual ACM Conference on Human Factors in Computing Systems [retrieved Feb. 18, 2022]. Retrieved from the Internet <https://citeseerx.ist.psu.edu/viewdoc/download?doi=10.1.1.671.5381&rep=rep1&type=pdf>., Apr. 18, 2015, 4 pages.

Pappagari, Raghavendra, et al., "Hierarchical Transformers for Long Document Classification", Cornell University arXiv, arXiv.org [retrieved Feb. 18, 2022]. Retrieved from the Internet <https://arxiv.org/pdf/1910.10781.pdf>., Oct. 23, 2019, 7 Pages.

Rex, Zhitao, et al., "Hierarchical Graph Representation Learning with Differentiable Pooling", Cornell University arXiv, arXiv.org [retrieved Feb. 21, 2022]. Retrieved from the Internet <https://arxiv.org/pdf/1806.08804.pdf>., Feb. 20, 2019, 11 Pages.

Ritchie, Daniel, et al., "d.tour: style-based exploration of design example galleries", Proceedings of the 24th annual ACM symposium on User interface software and technology [retrieved Feb. 21, 2022]. Retrieved from the Internet <https://web.archive.org/web/20150620032113id_/http://hci.stanford.edu/publications/2011/dtour/dtour-uist2011.pdf>., Oct. 16, 2011, 9 Pages.

Swearngin, Amanda, et al., "Rewire: Interface Design Assistance from Examples", CHI Conference on Human Factors in Computing Systems [retrieved Feb. 21, 2022]. Retrieved from the Internet <https://amaswea.github.io/assets/rewire/AmandaSwearngin_Rewire_CHI2018.pdf>., Apr. 24, 2018, 12 pages.

Wu, Wenming, et al., "Data-driven interior plan generation for residential buildings", ACM Transactions on Graphics vol. 38, No. 6 [retrieved Feb. 21, 2022]. Retrieved from the Internet <https://drive.google.com/file/d/1tVrtcASjX4FKmOwXn7MLdMkcCXIYpXCL/view>., Nov. 8, 2019, 12 Pages.

Yan, Sijie, et al., "Spatial Temporal Graph Convolutional Networks for Skeleton-Based Action Recognition", Cornell University arXiv, arXiv.org [retrieved Feb. 21, 2022]. Retrieved from the Internet <https://arxiv.org/pdf/1801.07455.pdf>., Jan. 25, 2018, 10 pages.

(56) References Cited

OTHER PUBLICATIONS

Yang, Xiao, et al., "Learning to Extract Semantic Structure from Documents Using Multimodal Fully Convolutional Neural Networks", Proceedings of the IEEE Conference on Computer Vision and Pattern Recognition (CVPR) [retrieved Feb. 21, 2022]. Retrieved from the Internet <https://openaccess.thecvf.com/content_cvpr_2017/papers/Yang_Learning_to_Extract_CVPR_2017_paper.pdf>., Jun. 7, 2017, 10 pages.

Zhang, Ziwei, et al., "Deep Learning on Graphs: A Survey", Cornell University arXiv, arXiv.org [retrieved Feb. 21, 2022]. Retrieved from the Internet <https://arxiv.org/pdf/1812.04202.pdf>., Mar. 13, 2020, 24 Pages.

Zhang, Xingxing, et al., "HIBERT: Document Level Pre-training of Hierarchical Bidirectional Transformers for Document Summarization", Cornell University arXiv, arXiv.org [retrieved Feb. 21, 2022]. Retrieved from the Internet <https://arxiv.org/pdf/1905.06566.pdf>., May 16, 2019, 11 Pages.

Zheng, Xinru, et al., "Content-aware generative modeling of graphic design layouts", ACM Transactions on Graphics, vol. 38, No. 4 [retrieved Feb. 21, 2022]. Retrieved from the Internet <https://www.cs.cityu.edu.hk/~rynson/papers/sigg19.pdf>., Jul. 12, 2019, 15 Pages.

\* cited by examiner

DIGITAL CONTENT LAYOUT ENCODING FOR SEARCH

BACKGROUND

A vast amount of digital content is made available in a variety of different scenarios, examples of which include billions of webpages, thousands of documents available via local storage on a computing device, and so on. Search has been used as a primary technique to locate a particular item of digital content of interest from this vast amount. Conventional techniques used to implement search initially relied on keyword searches in which keywords of a search query are matched to keywords associated with the digital content. Subsequent techniques were then developed to identify particular elements included within the digital content, e.g., objects in a digital image. However, each of these conventional examples rely on determining what is included in the digital content, and as such are incapable to addressing other aspects of the digital content as part of digital content search.

SUMMARY

Digital content layout encoding techniques for search are described. In these techniques, a layout representation is generated (using machine learning automatically and without user intervention) that describes a layout of elements included within the digital content. In an implementation, the layout representation includes a description of both spatial and structural aspects of the elements in relation to each other. To do so, a two-pathway pipeline that is configured to model layout from both spatial and structural aspects using a spatial pathway, and a structural pathway, respectively. In one example, this is also performed through use of multi-level encoding and fusion to generate a layout representation.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
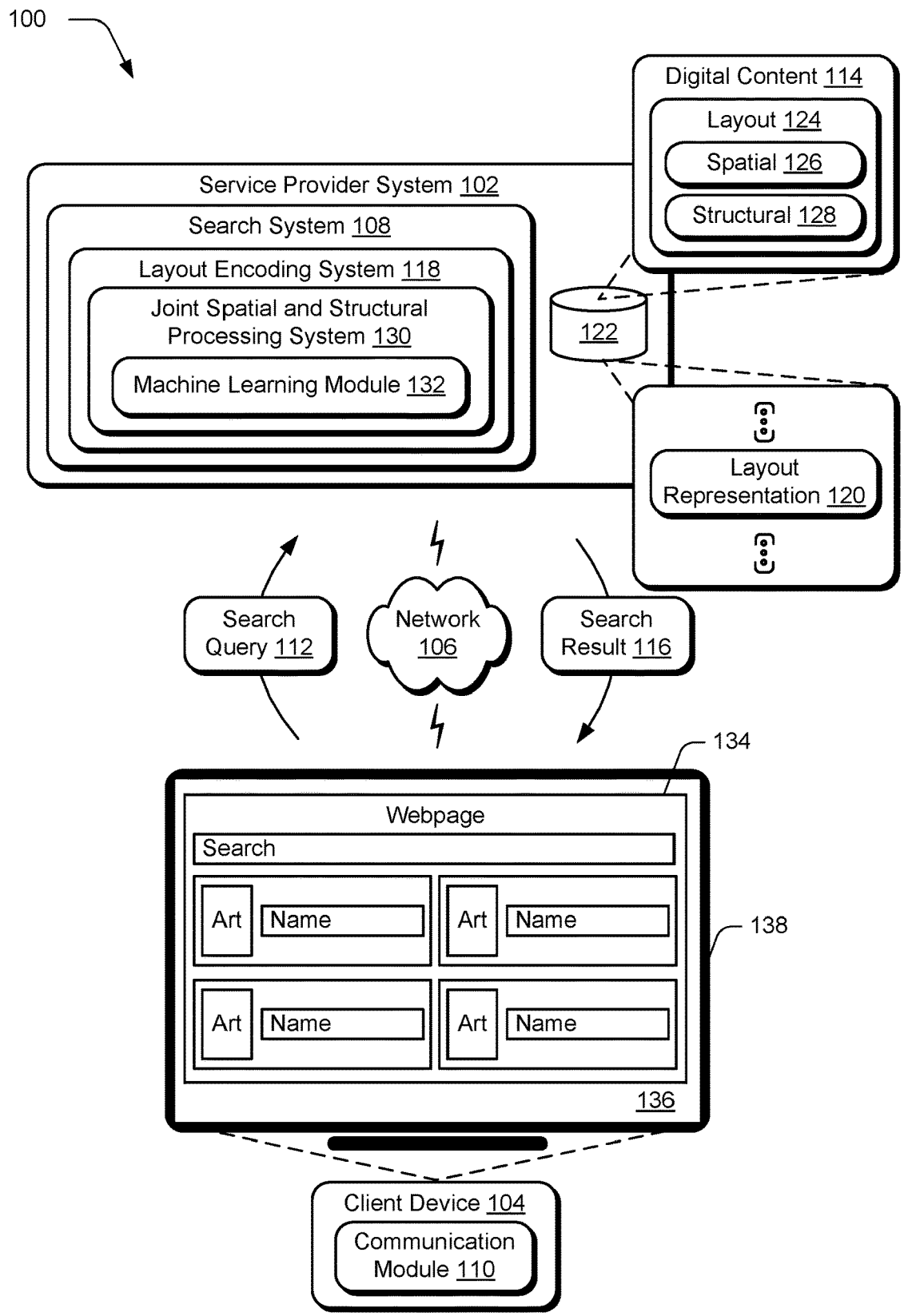
FIG. 1 is an illustration of a digital medium environment in an example implementation that is operable to employ digital content layout encoding techniques described herein.

Search is one of the primary techniques utilized through interaction with computing devices to locate digital content. Conventional digital content search techniques, however, focus on "what" is included in the digital content, e.g., through search queries to locate particular keywords, objects in digital images, utterances in digital audio, and so forth. As such, conventional techniques fail to address "how" the digital content is configured, e.g., a layout of the digital content. This reduces efficiency and operation of computing devices that implement these techniques as a consequence of repeated searches used to locate digital content of interest that lack accuracy.

Accordingly, digital content layout encoding techniques for search are described. In these techniques, a layout representation is generated (using machine learning automatically and without user intervention) that describes a layout of elements included within the digital content. In an implementation, this includes a description of both spatial and structural aspects of the elements in relation to each other. As a result, the techniques described herein support an ability to leverage layout as part of search, which is a central consideration as part of creating and editing digital content.

In one example, a layout encoding system receives digital content having a plurality of elements, e.g., text, digital images, etc. Hierarchy data is then generated by the layout encoding system that describes both spatial and structural information of a layout of the elements within the digital content. The elements and internal relationships, for instance, are treaded as nodes and edges for graph construction of a hierarchical structure. This is performable in a variety of ways, e.g., by examining a markup language, use of bounding boxes to examine nested relationships, and so on.

The layout encoding system then extracts levels from the hierarchy data, e.g., as level-wise layout features forming a plurality of layers from a root through successive layers within the hierarchical structure. Once the layers are formed, the layout encoding system generates a layout representation of the digital content. The layout system, for instance, is configured as a two-pathway pipeline that includes a spatial pathway and a structural pathway that implement feature extraction, encoding, decoding, and loss supervision to form the feature representation as including both structural and spatial features. In an implementation, the spatial features are represented using a segmentation map (e.g., a semantic segmentation map) and the structural feature are represented using an adjacent matrix, e.g., a structural adjacency matrix.

The layout encoding system, for instance, employs a multi-level encoding and progressive level fusion technique to iteratively encode the layers to form the layout representation. A first layer, for instance, is encoded using a first encoder to form first feature data which is then processed using a decoder (e.g., a first deconv block) to form a first level representation. A second layer is also encoded using an encoder. However, in this instance a fusion module is utilized to form second feature data corresponding to the second level by fusing the encoding of the first layer with an encoding of the second layer. A second decoder (e.g., second deconv block) is used to generate the second level representation using the second feature data. This technique progresses through successive layers by using the fused feature data from a previous layer.

Therefore, each layer has a corresponding level representation that collectively form the layout representation. Continuing the example in which the layout encoding system is configured as a two-pathway pipeline, each level representation represents spatial features using a respective semantic segmentation map and the structural feature using a respective adjacency matrix. Thus, the layout representation functions as a measurement of spatial and structure elements within the digital content. As such, the layout representation is usable in a comparison with other layout representations to determine relative amount of similarity as part of a search, e.g., web search, recommendation engine, and so forth. In this way, the layout representation increases accuracy and improves function of computing devices that implement these search techniques. Further discussion of these and other examples are included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital content layout encoding techniques described herein. The illustrated environment 100 includes a service provider system 102 and a client device 104 that are communicatively coupled, one to another, via a network 106, and implemented via respective computing devices.

Figure 7:
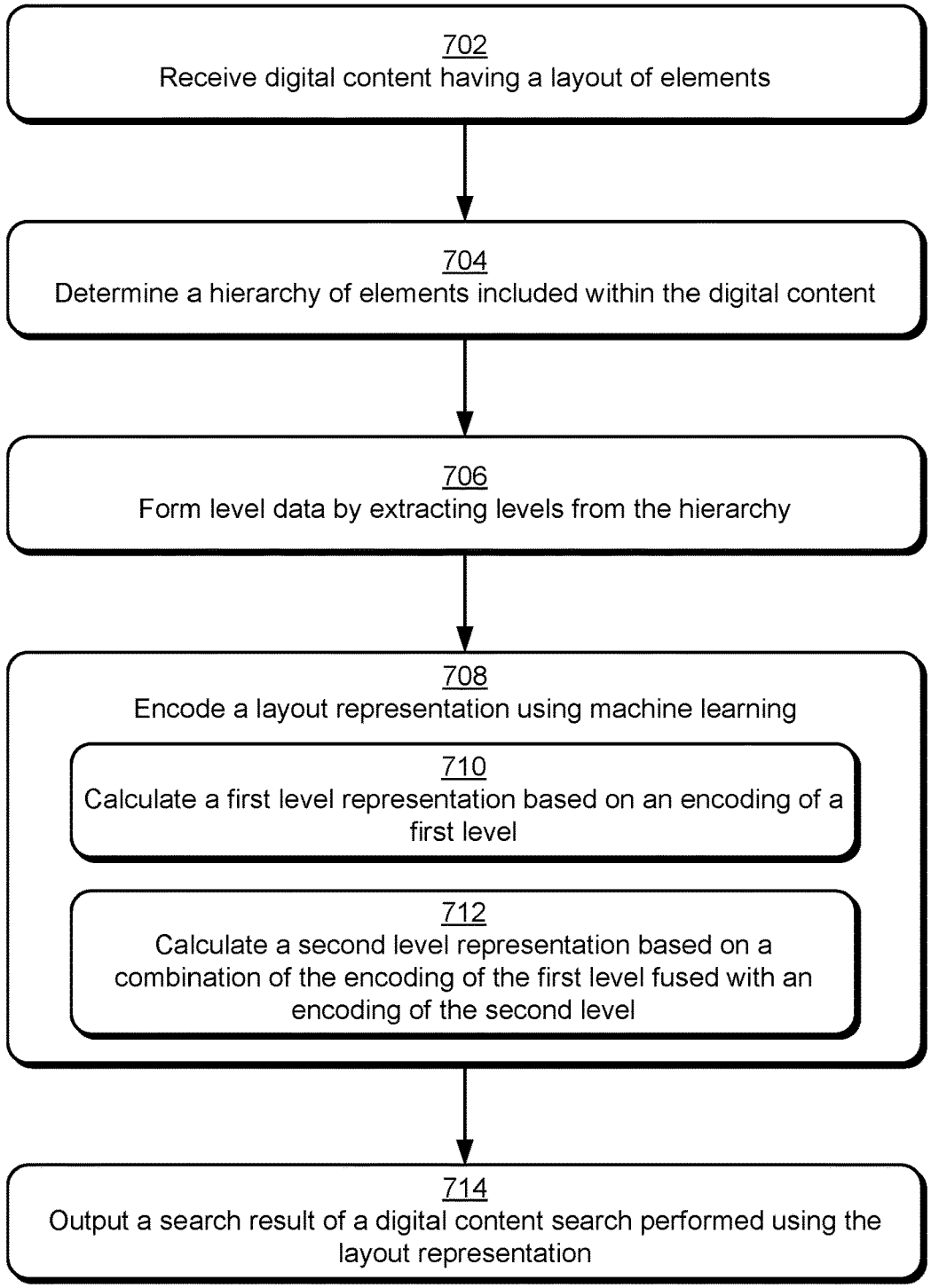
FIG. 7 is a flow diagram depicting a procedure in an example implementation of digital content layout encoding for search.

A computing device is configurable in a variety of ways such as a desktop computer, a laptop computer, a mobile device (e.g., assuming a handheld configuration such as a tablet or mobile phone as illustrated), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is described in instances in the following discussion, a computing device is also representative of a plurality of different devices, such as multiple servers utilized by a business to perform operations "over the cloud." The computing devices, for instance, include a processing device and a computer-readable storage medium to perform operations as further described in relation to FIG. 7.

The service provider system 102 includes a search system 108 that is accessible to a communication module 110 (e.g., browser, network enabled application) of the client device 104 via the network 106. In the illustrated example, a search query 112 is communicated via the network 106, processed by the search system 108 to search digital content 114, and a search result 116 is returned to the client device 104. Other examples are also contemplated, including incorporation of the search system 108 locally at the client device 104.

The search system 108 includes a layout encoding system 118 that is configured to generate a layout representation 120 of the digital content 114, which is illustrated as stored in a storage device 122. Digital content 114, in some instances such as interface designs, graphic templates, sketches, and posters exhibit rich structural characteristics in a corresponding layout 124. Accordingly, accuracy of the layout representation 120 benefits real world applications such as similarity search and design recommendation. Thus, the layout representation 120 supports an ability for search by similarity of layout representations to each other, e.g., to locate digital content 114, as part of a recommendation engine, and so forth.

Layout 124 is a special data type featuring both visual characteristics (e.g., in two dimensions) and ontological relationships of contained elements. The illustrated layout 124 representation captures high-level relationships among elements included within the digital content 114, both from the spatial 126 as well as structural 128 perspective. These dual perspectives are unified by a hierarchical decomposition through use of a joint spatial and structural processing system 130 that leverages a machine learning module 132 to form the layout representation 120, e.g., using a two-pathway pipeline to model both spatial and structural aspects as further described in relation to FIG. 6.

Elements in a layout typically have varying spatial sizes and varying prominence when being viewed at a corresponding spatial resolution. When encoding the layout representations for a webpage 134 illustrated in a user interface 136 rendered by a display device 138, for instance, larger layout elements tend to appear towards the root of the structural hierarchy, serving as an outline or visual gist, whilst smaller elements encoding layout details often appear towards the leaves of the structural hierarchy. Yet, elements are also interrelated according to this layout structure. In a poster or interface design, for example, layout elements are often spatially aligned within a given hierarchical layer. Conventional techniques that address layout, however, treat each element as equivalent to construct a dense graph that ignores structural characteristics of the elements in relation to each other. In the present techniques, on the other hand, the layout representation 120 is configurable as a hierarchical structure constructed a sparse tree data format that captures both spatial 126 and structural 128 information.

Accordingly, in the following discussion an architecture is described that generates the layout representation 120 from a joint spatial and structural perspective using a joint spatial and structural processing system 130 by leveraging a machine learning module 132. Convolutional Neural Networks (CNNs), for instance, are employed by the layout encoding system 118 to modeling spatial signals. Graph Neural Networks (GNNs), on the other hand, are implemented as part of the machine learning module 132 for analyzing structural data.

In order to train the machine learning module 132, a metric is employed by the layout encoding system 118 that leverages structural similarity based on a "tree edit distance," e.g., similarity as a distance defined by edits made to one tree to match another tree. Training of the machine learning module 132 by the layout encoding system 118, for instance, is performed using annotated elements (e.g., bounding boxes and associated element class information) to build a sparse tree structure from the flat input boxes with document meta information.

The tree structure supports decomposition of the layout 124 into respective levels to match the multi-resolution spatial hierarchy of the digital content 114. In this way, level-wise features are obtained that describe the layout 124 at different resolutions and granularities. In an implementation, the features encoded across different levels by the layout encoding system 118 are fused recursively to represent an entirety of the layout hierarchy. To enforce learning of both of spatial 126 and structural 128 information in the layout representation 120, a two-pathway connection is utilized in the design of the joint spatial and structural processing system 130, which is supervised by the reconstruction of spatial semantic maps and structural adjacency matrix, respectively, as further described in relation to FIG. 6. Further discussion of digital content layout encoding and generation of the layout representation 120 is described in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combination and are not limited to the particular combinations represented by the enumerated examples in this description.

Encoding a Layout Representation of Digital Content

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6 in parallel with a procedure 700 of FIG. 7 describing digital content layout encoding techniques for search.

In the following discussion, the joint spatial and structural processing system 130 is configured as a spatial-structural hierarchical auto-encoder (SSH-AE) that is employed to learn layout representations 120 for digital content 114. The overall framework is illustrated in in an example system 200 of FIG. 2. The layout representation 120 in this example contains both spatial and structural patterns for downstream tasks. The joint spatial and structural processing system 130 receives digital content 114 that includes a layout of elements, e.g., design components such as text and digital images. Hierarchy data is extracted from the digital content 114 as a hierarchical tree structure describing an inherent structure (e.g., with groups, layers, and alignment information) of the elements in the digital content. Geometric features of the elements are then encoded by the joint spatial and structural processing system 130 that describe the characteristics of the nodes and edges in the tree hierarchy. Then, a multi-level hierarchical encoder-decoder structure of the joint spatial and structural processing system 130 is used to progressively compute the layout representation 120 for the layout 124 of the digital content 114. To do so, spatial and structural information is encoded as level-wise features for each layer, e.g., through a fusion technique.

Figure 2:
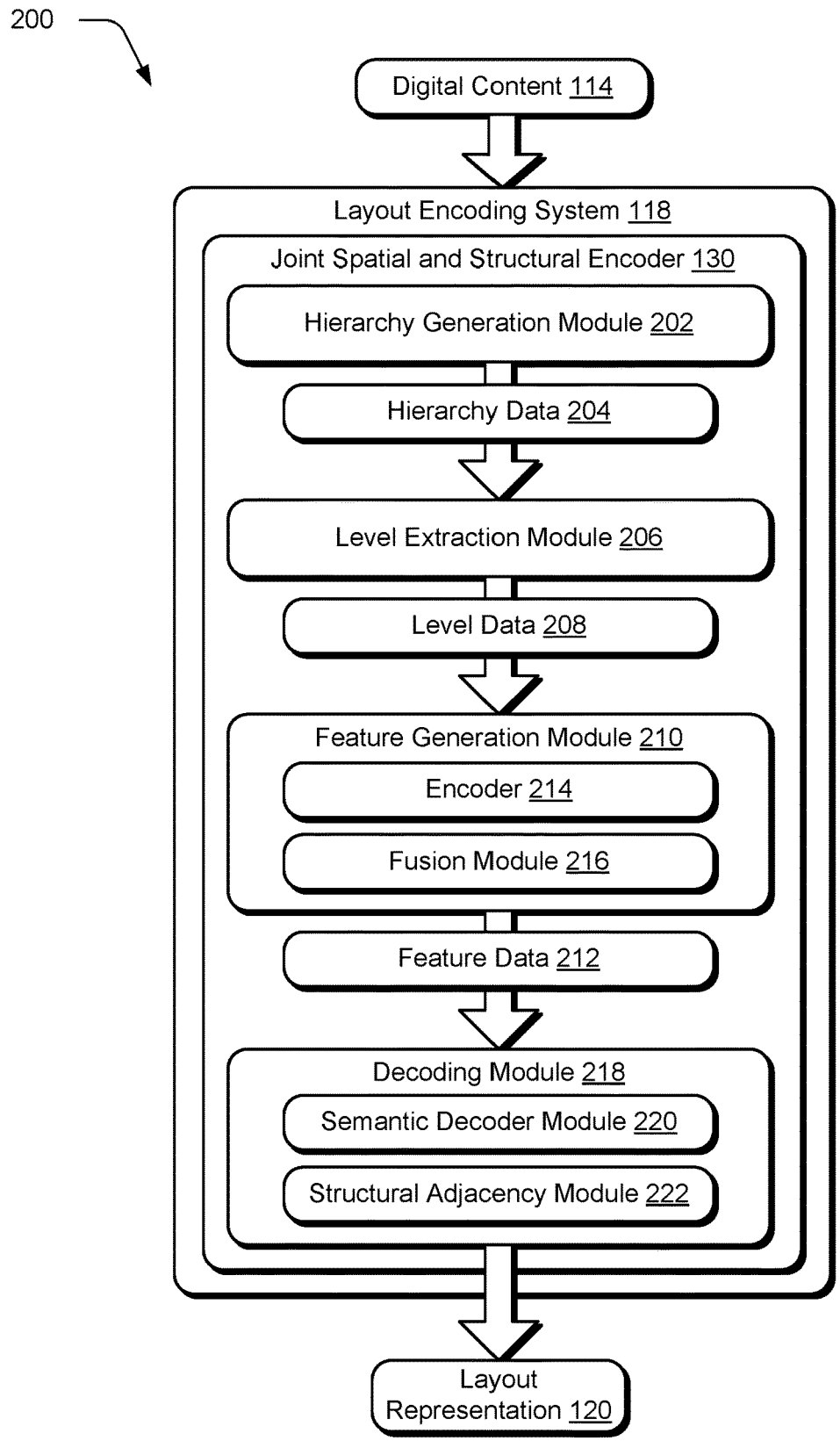
FIG. 2 depicts a system in an example implementation showing operation of a layout encoding system of FIG. 1 in greater detail.

In the example system 200 of FIG. 2, digital content 114 having a layout 124 of elements is received (block 702) by the layout encoding system 118. As previously described, the digital content 114 is configurable in a variety of ways, examples of which include digital documents, webpages, digital images, digital video, user interfaces of applications, and so forth.

A hierarchy generation module 202 is then employed to determine a hierarchy of elements included with the digital content 114 (block 704), which is referred to as hierarchy data 204. Hierarchies are configurable in a variety of ways in order to describe a wide variety of elements and relationships of those elements to each other.

Figure 3:
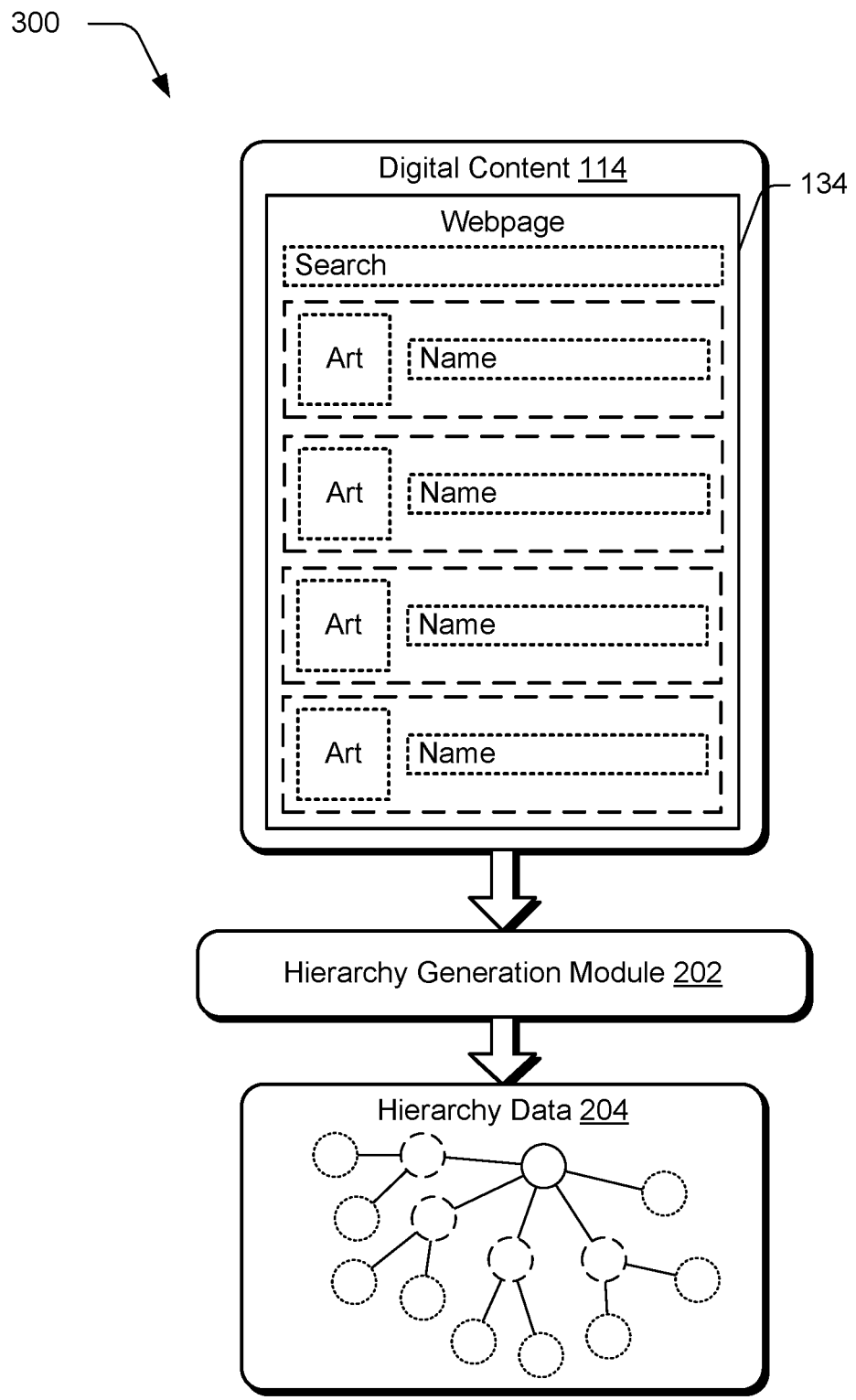
FIG. 3 depicts an example system showing operation of a hierarchy generation module of FIG. 2 in greater detail.
Figure 4:
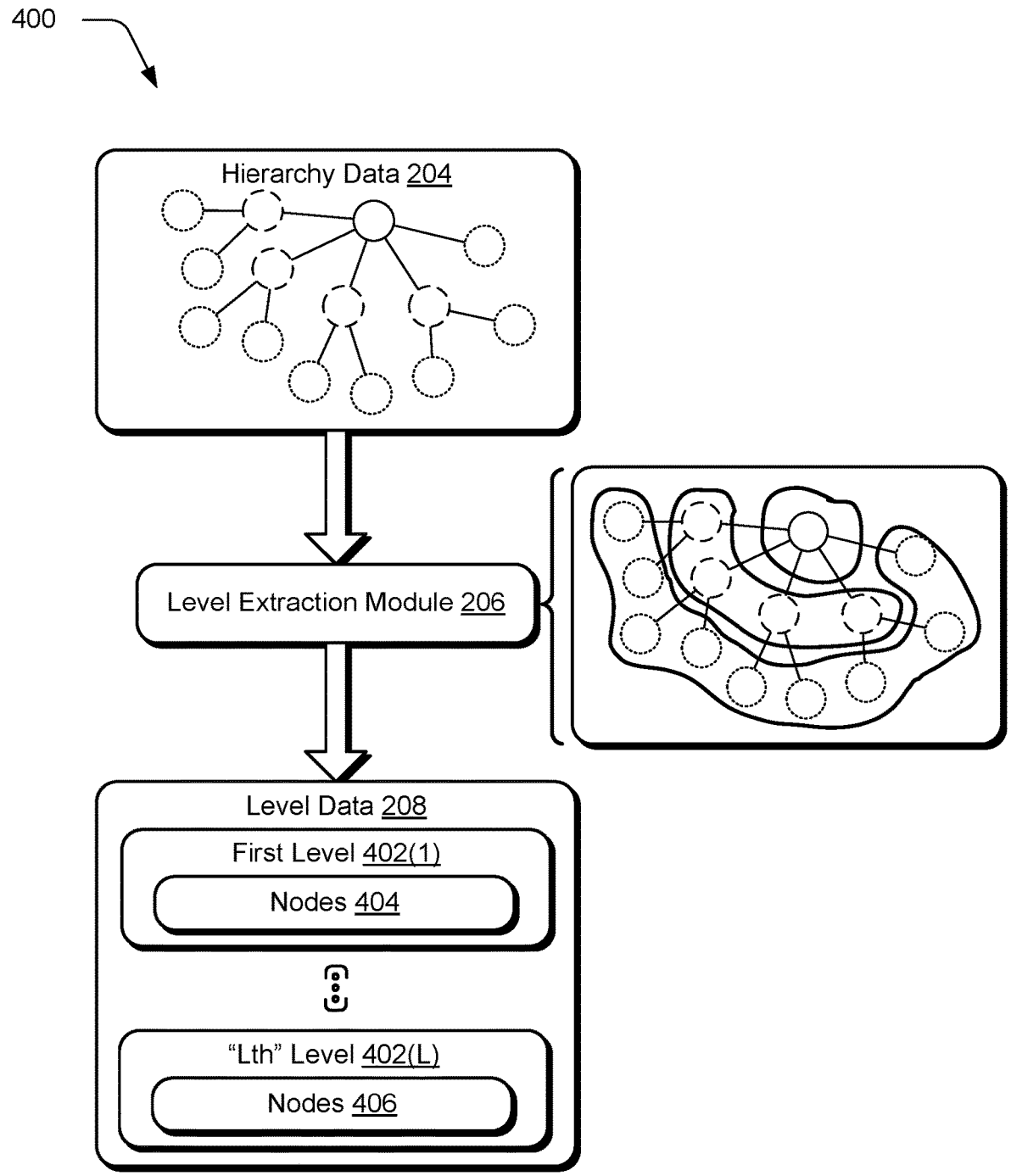
FIG. 4 depicts a system in an example implementation showing operation of a level extraction module of FIG. 2 in greater detail.

FIG. 3 depicts an example system 300 showing operation of the hierarchy generation module 202 of FIG. 2 in greater detail. The digital content 114 is configured in this instance as a webpage 134. In order to determine the hierarchy of elements within the webpage 134, bounding boxes are formed for respective elements, which are illustrated using respective dashed lines. Relationships of the elements to each other are then used to determine hierarchy, which is the illustrated instance is based on whether a bounding box is included within another bounding box, i.e., a nesting relationship of the bounding boxes to each other.

A solid line for a webpage as a whole, for example, includes additional elements that in some instances include further elements. Thus, a node (illustrated as a solid line) is set as a root node in this example, that is linked to addition nodes (illustrated using large-dashed lines), that are further linked to nodes having fine-dashed lines to form the hierarchy data 204. Other examples are also contemplated, such as to "walk a tree" of a markup language used to form the digital content 114, to follow a defined ordering (e.g., top-left to bottom-right), and so forth. In one example, "T={V, C}" defines a tree for a layout hierarchy of the hierarchy data 204 with nodes "V={$v_1, \ldots, v_i, \ldots, v_n$}" and edge connections "C={$c_{1,2}, \ldots, c_{i,j}, \ldots, c_{n-1,n}$}." Each node "$v_i$" has a semantic label "$s_i$" and a geometric feature "$g_i^v$."

Returning again to FIG. 2, the hierarchy data 204 is received as an input by a level extraction module 206. The level extraction module 206 is configured to form level data 208 by extracting levels from the hierarchy (block 706), e.g., the hierarchy data 204. To do so as illustrated in the example implementation 400 of FIG. 4, for instance, the level extraction module 206 forms first through "Lth" levels 402(1)-402(L) having respective nodes 404, 406 taken from the hierarchy data 204 that represent respective elements of the digital content 114.

Continuing the above example, in order to fully explore the structured information contained in the tree "T" of the hierarchy data 204, the tree "T" is separated into several levels (e.g., first through "Lth" levels 402(1)-402(L)) so that layout information having different respective amounts of importance and granularity are accurately encoded and aggregated. A variety of ways are usable to split tree levels based on spatial and structural aspect, respectively. In one instance, for each element in the digital content 114 and therefore respective nodes in the hierarchy data 204 "T" are ranked, respectively, according to element areas "$A_i$" (spatial) and/or depths "$d_i$" (structural). The rankings are evenly divided to split "T" into "L" levels. In this way, the complete tree is represented as "T=$T^1 \cup T^2 \cup, \ldots, \cup T^L$" with corresponding nodes "V=$V^1 \cup V^2 \cup, \ldots, \cup V^L$" and edges "C=$C^1 \cup C^2 \cup, \ldots, \cup C^L$." A variety of other instances are also usable to form levels of the level data 208 are also contemplated.

The level data 208 is then utilized by the layout encoding system 118 to encode the layout representation 120 using machine learning (block 708). A feature generation module 210, for instance, is utilized to generate feature data 212, e.g., based on respective levels in the level data 208. In one example, the feature generation module 210 employs an encoder 214 and fusion module 216 along with a decoding module 218 having a semantic decoder module 220 and a structural adjacency module 222 as part of a multi-level encoding and decoding architecture.

Figure 5:
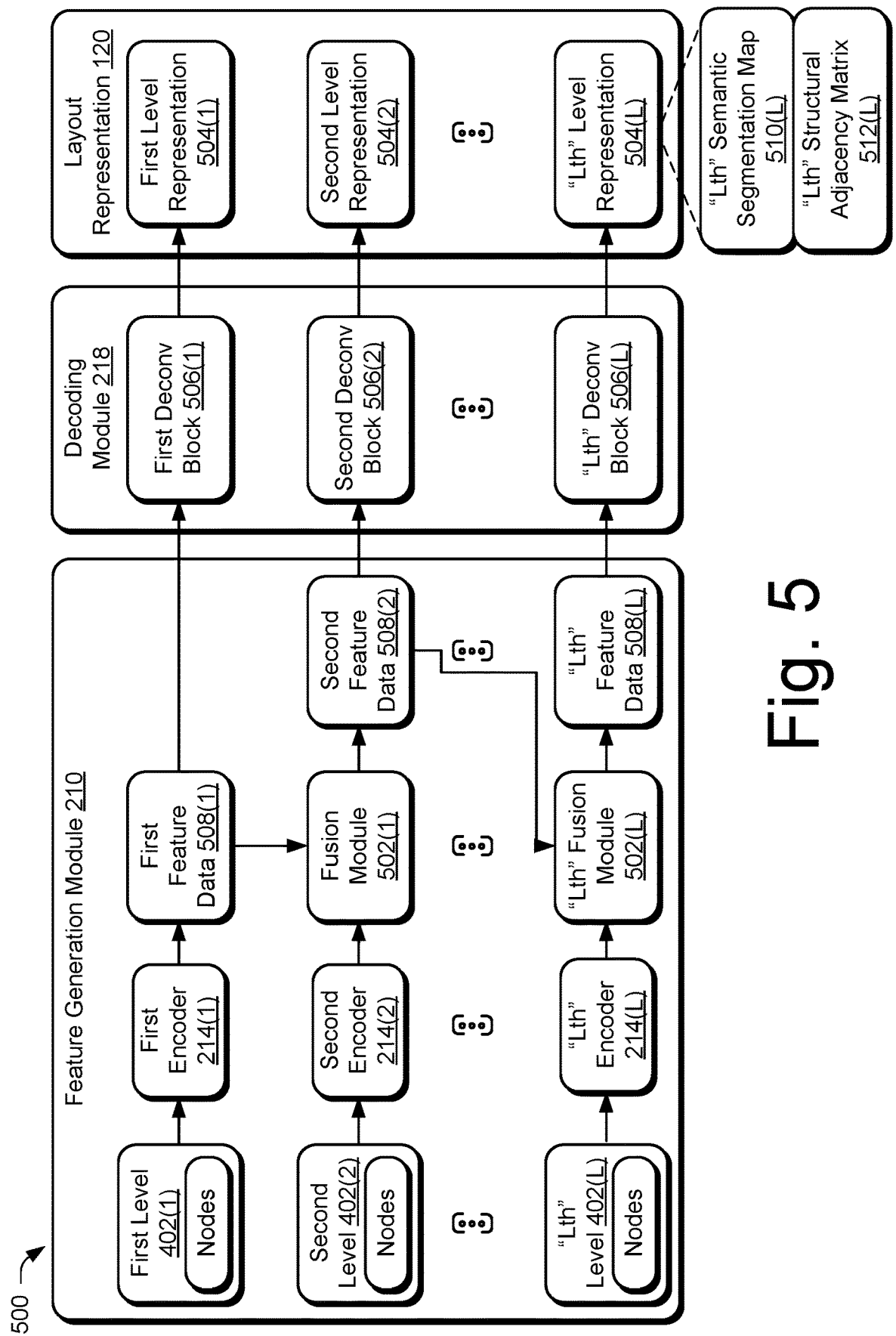
FIG. 5 depicts a system in an example implementation of multi-level encoding and fusion techniques.

FIG. 5 depicts an example system 500 showing operation of the feature generation module 210 and decoding module 218 of FIG. 2 in greater detail. The encoder 214 is implemented as a multi-level encoder using first, second, and "Lth" level encoders 214(1), 214(2), ..., 214(L) that first individually processes each of the first, second, and "Lth" levels 402(1), 402(2), ..., 402(L). Fusion operations implemented using respective fusion modules 502(1), ..., 502(L) are then used to progressively aggregate the level-wise features from low level to high level with a feature fusion operation. In this way, layout representation 120 is formed as multi-level layout representation including first, second, and "Lth" level representations 504(1), 504(2), ..., 504(L). Decoding as implemented by the decoding module 218 also adopts a multi-level reconstruction strategy in accordance with the encoding through use of a first, second, and "Lth" deconv blocks 506(1), 506(2), ..., 506(L).

To begin, for instance, first level 402(1) data is encoded by a first encoder 214(1) directly to form first feature data 508(1), which is then reconstructed by a first deconv block 560(1) of the decoding module 218 to form a first level representation 504(1).

In successive levels after the first level, fusion techniques are then employed to leverage features extracted from previous layers iteratively to form representations of respective levels. Continuing the example above, second level 402(2) data is encoded by a second encoder 214(2). A fusion module 502(1) then employs a fusion operation to generate second feature data 508(2) by fusing an encoding of the second level 402(2) with an encoding of the first level 402(1), i.e., the first feature data 508(1).

As such, the first level representation is calculated based on an encoding of a first level (block 710) and a second level representation is based on a combination of the encoding of the first level fused with an encoding of the second level (block 712). This process continues through successive levels by fusing features combined from previously levels with a current level, e.g., for a third level using the second feature data 508(2) combined from the first and second levels 402(1), 402(2), and so on. For example, "Lth" level 402(L) data is encoded by an "Lth" encoder 214(L) and combined with second feature data 508(2) to for "Lth" feature data 508(L) and a corresponding "Lth" level representation 504(L).

Figure 6:
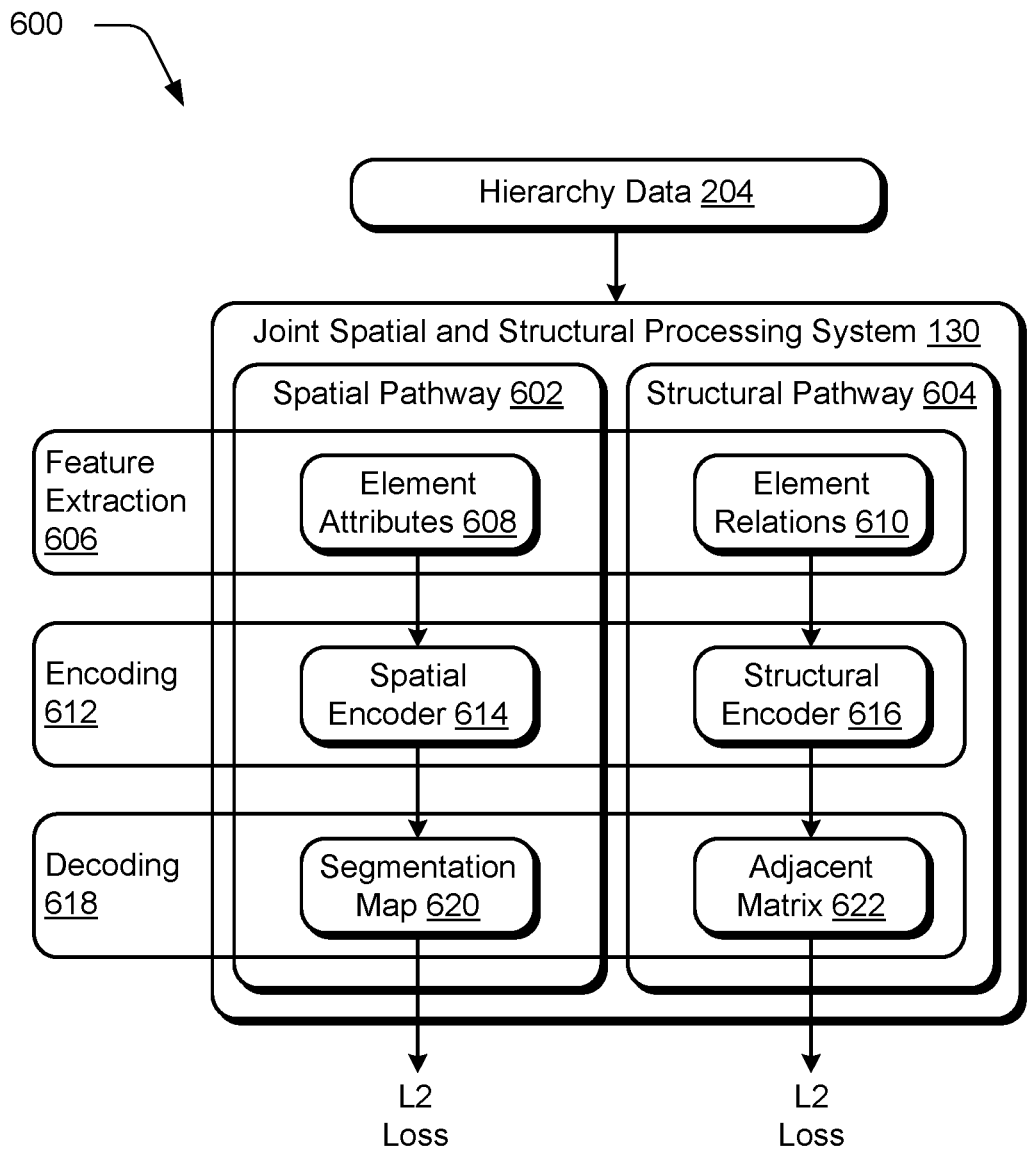
FIG. 6 depicts a system in an example implementation in which a joint spatial and structural processing system of FIG. 2 is implemented as a two-pathway pipeline that is configured to model layout from both spatial and structural aspects using a spatial pathway, and a structural pathway, respectively.

Moreover, both the encoders and decoders are implementable using a two-pathway pipeline architecture as described in greater detail in relation to FIG. 6 that is configured to reconstruct the spatial and structural information of the layout, respectively. The learning of such information is driven by the semantic label maps and component adjacency matrix derived from the layout tree data.

Continuing with the above example, each level "l" is configured as a sub-tree "$T^l = \{V^l, C^l\}$." In each sub-tree "$T^l$," node label, node geometry, and edge geometry for level "l" are represented, respectively, as "$S^l$," "$G^{v^l}$," and "$G^{c^l}$." For simplicity in the following discussion, the "l" is omitted in the level-wise description and therefore are denoted as "S," "$G^v$," and "$G^c$." The level-wise encoder is described as:

$$\tilde{f}=E(S,G^v,G^c), \quad (3)$$

where "E" takes three tree attributes as inputs and outputs the level-wise feature "$\tilde{f}$," e.g., as "Lth" semantic segmentation map 510(L) and "Lth" structural adjacency matric 512(L) for spatial and structure features at each level, respectively. In this implementation, the first, second, and "Lth" encoders 214(1)-214(L) are implemented as a single shared encoder "E" for multiple levels.

FIG. 6 depicts a system 600 in an example implementation in which the joint spatial and structural processing system 130 is implemented as a two-pathway pipeline that is configured to model layout from both spatial and structural aspects using a spatial pathway 602 and a structural pathway 604, respectively. Feature extraction 606 is performed to extract element attributes 608 in the spatial pathway 602 and element relations 610 in the structural pathway 604. Encoding 612 is then performed using a respective spatial encoder 614 and structural encoder 616, an output of which is used in decoding 618 to arrive at a segmentation map 620 and adjacent matric 622 as the level-wise features that form the layout representation 120.

Continuing with the above mathematical example, the one-hot semantic label "$s_i \in S$" and node geometric feature "$g_i^v \in G^v$" are concatenated for each node "i," and projected as a complete node feature "$f_i^v$" for spatial content learning:

$$f_i^v = E^v([s_i, g_i^v]), \quad (4)$$

where "$E^v$" is implemented as a multilayer perceptron (MLP) by the machine-learning module 132. MLP is a fully connected class of feedforward artificial neural network. The node features are then combined with a semantic-keyed attention module:

$$f^v = \sum_i \alpha_i^v f_i^v$$

where "$\alpha_i^v \propto \exp(w_v^T s_i)$" is the normalized attention weight with learnable parameter "$w_v$."

For structural encoding as implemented by the structural encoder 616, each edge feature "$g_{i,j}^c \in G^c$" is projected together with the paired node features with a multi-layer perception "$E^c$" as:

$$f_{i,j}^c = E^c([f_i^v, f_j^v, g_{i,j}^c]).$$

Edge features are combined with a node-keyed attention module:

$$f^c = \sum_{ij} \alpha_{ij}^c f_{i,j}^c,$$

where "$\alpha_{i,j}^c \propto \exp(w_c^T [f_i^v, f_j^v])$" is the normalized attention weight with learnable parameter "$w_c$."

Finally, the spatial and structural features $f^v/f^c$ are fed through another MLP $E^{v2}$ and $E^{c2}$ to form the layout feature "$\tilde{f}$" (i.e., a corresponding encoding) for the current level:

$$\tilde{f} = [v^2(f^v), E^{c2}(f^c)]$$

After obtaining level-wise features $\{\tilde{f}^1, \tilde{f}^2, \ldots, \tilde{f}^L\}$ as encoded by the encoder 214, a recursive level fusion techniques is used as previously described by respective fusion modules 502(1)-502(L) to obtain the entire layout representation 120 from low level to high level. In this way, the feature "$f^l$" of each level "l" is progressively constructed with increasing amount of detail from lower levels:

$$f^1 = \tilde{f}^1,$$

$$f^l = U^{l-1}(f_{l-1}) \oplus \tilde{f}^l, l \geq 2$$

where "$U^{l-1}$" is an MLP that aligns the feature from level "l−1" to "l," and "⊕" is the fusion operation, e.g., a summation. As a result, each level has a feature (i.e., corresponding level feature data) that contains integrated information from each of the levels below it. The multi-level feature data $F=\{f^1, f^2, \ldots, f^L\}$ is passed to the decoding module 218 in training and can also be used for downstream tasks such as retrieval and classification.

Based on the multi-level features "$F=\{f^1, f^2, \ldots, f^L\}$" described in respective feature data, the decoding module 218 is implemented as a multilevel decoder to generate multi-branch outputs corresponding to each level. Each feature "$f^l$" is used to generate a output "$I^l$" with a series of shared base decoding modules "$\{D^1, D^2, \ldots, D^l\}$" and a level-specific readout module "$R^l$":

$$I^l = R^l \cdot D^l \cdot D^{l-1} \cdot \ldots \cdot D^1(f^l),$$

where "·" denotes the sequential application of model operations. The decoding modules "$D^l$" and level-specific readout module "$R^l$" are implemented as deconvolution blocks as shown in FIG. 5.

Similar to the encoding process, the decoding module 218 also implements a two-pathway design (e.g., for spatial and structural considerations) so that the entire model is supervised from both spatial and structural information to improve learning of the layout representation 120. Accordingly, the ground truth "$O^l$" for the decoded image "$I^l$" is constructed in the following two ways.

To generate a semantic segmentation map, given a bounding box "$(x_i, y_i, w_i, h_i)$" and semantic label "$s_i$" for each element (and respective node) belonging to level "l" in a layout tree of the hierarchy data 204, a multichannel binary image "$O^l \in \mathbb{R}^{h_l \times w_l \times M}$" is obtained as semantic segmentation ground truth for the current level, where "M" is a total number of semantic classes. Each channel "m" is a spatial mask for the elements belonging to class "m." The values "$(w_l, h_l)$" specifying a spatial size of "$O^l$" which matches an output resolution of the decoding module 218 at level "l."

The structural adjacency matrix is used to describe structure within the layout. Given a sub-tree hierarchy at level "l," a determination is made as to how many edges are connected between each pair of level combinations and each pair of semantic class combinations. In this way, a tensor "$O^l \in \mathbb{R}^{M \times M \times (l \times l)}$" is obtained with "l×l" channels, where each channel is a "M×M" adjacency matrix representing the class-wise connection relationship. As a result, "$O^l$" provides supervision of the structural information from both class-wise and level-wise perspectives.

In an implementation, a L2 reconstruction loss "$\|O^l - I^l\|$" is used as the optimization objective in training the encoders and decoders at each of the levels. Two versions of readout module "$R^l$" are trained for the spatial and structural objectives individually.

As a result, the layout representation 120 is configured as a plurality of level representations, each describing spatial and structural features for those levels, e.g., through respective semantic segmentation maps and structural adjacency matrices. The layout representation 120 is usable to support a variety of search functionality. A search query 112, for instance, is configurable as a layout representation that is usable to locate a corresponding layout representation based on similarity of the representations to each other. A search result of a digital content search performed using the layout representation is then output (block 714), e.g., to locate a particular layout 124 of interest. In this way, the techniques described herein overcome conventional challenges that are limited to "what" digital content is being searched to expand to "how" the digital content is configured via a respective layout 124.

Example System and Device

Figure 8:
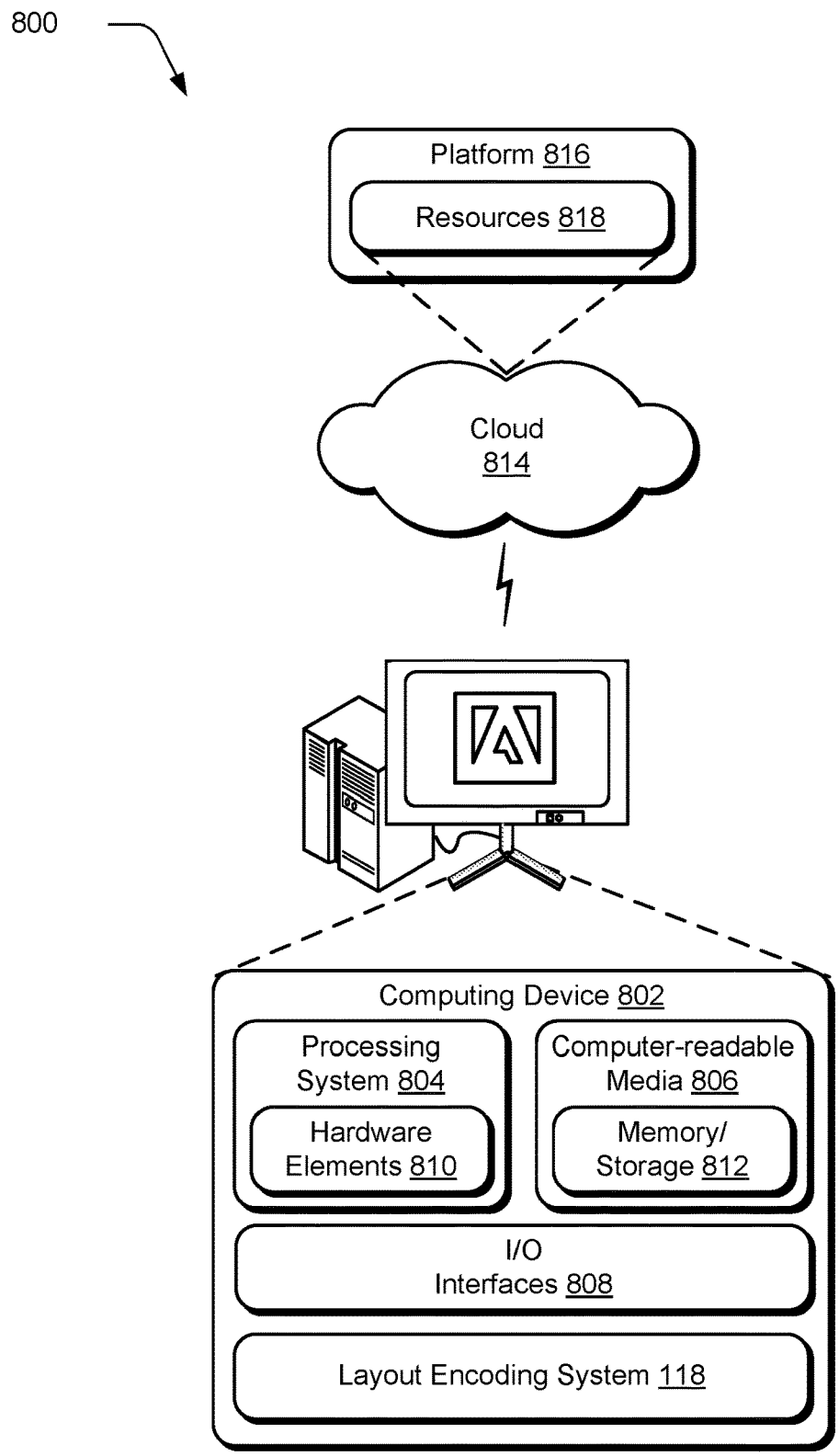
FIG. 8 illustrates an example system generally at that includes an example computing device that is representative of one or more computing systems and/or devices that implement the various techniques described herein.

FIG. 8 illustrates an example system generally at 800 that includes an example computing device 802 that is representative of one or more computing systems and/or devices that implement the various techniques described herein. This is illustrated through inclusion of the layout encoding system 118. The computing device 802 is configurable, for example, as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information stored thereon that causes operations to be performed by a processing device in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
    forming, by the processing device, level data by extracting first and second levels from a hierarchy of elements included within digital content;
    encoding, by the processing device, a layout representation of the digital content based on the level data using machine learning, the encoding based on a combination of an encoding of the first level fused with an encoding of the second level; and outputting, by the processing device, a search result of a digital content search performed using the layout representation.

2. The method as described in claim 1, wherein the hierarchy is included as part of hierarchy data that describes a spatial and structural layout of the elements in the digital content.

3. The method as described in claim 1, wherein the encoding includes:
calculating a first level representation included as part of the layout representation based on an encoding of the first level; and
calculating a second level representation included as part of the layout representation, the second level representation based on a combination of the encoding of the first level fused with the encoding of the second level.

4. The method as described in claim 3, wherein:
the forming includes forming a third level from the hierarchy; and
the encoding includes calculating a third level representation included as part of the layout representation based on a combination of the encoding of the first level fused with an encoding of the second level along with an encoding of the third level.

5. The method as described in claim 1, wherein the layout representation represents both spatial aspects and structural aspects of the digital content.

6. The method as described in claim 5, wherein the spatial aspects are described using a semantic segmentation map.

7. The method as described in claim 5, wherein the structural aspects are described using a structural adjacency matrix.

8. The method as described in claim 5, wherein the spatial aspects and the structural aspects are included as part of the layout representation for each of the first and second levels.

9. The method as described in claim 5, wherein the encoding of the layout representation is performed using a joint spatial and structural processing system, the joint spatial and structural processing system including:
a spatial pathway configured to model the spatial aspects of the digital content as part of the layout representation; and
a structural pathway configured to model the structural aspects of the digital content as part of the layout representation.

10. A system comprising:
a hierarchy generation module implemented by a processing device to perform feature extraction to generate hierarchy data describing a spatial and structural layout of elements included within digital content; and
a joint spatial and structural processing system implemented by the processing device to generate a layout representation of the digital content based on the hierarchy data using machine learning, the joint spatial and structural processing system including:
a spatial pathway configured to model spatial aspects of the digital content as part of the layout representation; and
a structural pathway configured to model structural aspects of the digital content as part of the layout representation.

11. The system as described in claim 10, wherein the spatial aspects are modeled as a semantic segmentation map.

12. The system as described in claim 10, wherein the structural aspects are modeled as a structural adjacency matrix.

13. The system as described in claim 10, wherein the spatial pathway and the structural pathway implement the machine learning using encoders, respectively, to generate feature data and decoders to generate the layout representation using the feature data.

14. The system as described in claim 10, wherein the joint spatial and structural processing system is configured to model the spatial aspects and the structural aspects for each of a plurality of levels of the hierarchy data.

15. One or more computer-readable storage media having instructions stored thereon that, responsive to execution by a processing device, causes the processing device to perform operations including:
encoding a layout representation of digital content using machine learning based on level data, the level data extracted from a hierarchy of elements of the digital content, the encoding including:
calculating a first level representation included as part of the layout representation based on an encoding of a first level of the level data; and
calculating a second level representation included as part of the layout representation based on a combination of the encoding of the first level fused with an encoding of a second level of the level data.

16. The one or more computer-readable storage media as described in claim 15, wherein the layout representation represents both spatial aspects and structural aspects of the digital content.

17. The one or more computer-readable storage media as described in claim 16, wherein the spatial aspects are described using a semantic segmentation map.

18. The one or more computer-readable storage media as described in claim 16, wherein the structural aspects are described using a structural adjacency matrix.

19. The one or more computer-readable storage media as described in claim 16, wherein the spatial aspects and the structural aspects are included as part of the layout representation for each of the first and second levels.

20. The one or more computer-readable storage media as described in claim 16, wherein the encoding of the layout representation is performed using a joint spatial and structural processing system, the joint spatial and structural processing system including:
a spatial pathway configured to model the spatial aspects of the digital content as part of the layout representation; and
a structural pathway configured to model the structural aspects of the digital content as part of the layout representation.

* * * * *